US009250760B2

(12) United States Patent
Balasubramanyan et al.

(10) Patent No.: US 9,250,760 B2
(45) Date of Patent: Feb. 2, 2016

(54) CUSTOMIZING A DASHBOARD RESPONSIVE TO USAGE ACTIVITY

(71) Applicant: International Business Machines Corporation, Armonk, NY (US)

(72) Inventors: Arun Balasubramanyan, Chennai (IN); Mary E. Rudden, Denver, CO (US); Donald E. Schaefer, Loveland, CO (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 13/901,615

(22) Filed: May 24, 2013

(65) Prior Publication Data
US 2014/0351708 A1 Nov. 27, 2014

(51) Int. Cl.
*G06F 3/00* (2006.01)
*G06F 3/048* (2013.01)
*G06F 9/44* (2006.01)
*H04L 29/08* (2006.01)
*G06Q 10/06* (2012.01)
*G06Q 30/02* (2012.01)

(52) U.S. Cl.
CPC *G06F 3/048* (2013.01); *G06F 9/44* (2013.01); *G06F 9/4443* (2013.01); *H04L 67/22* (2013.01); *G06Q 10/06398* (2013.01); *G06Q 30/02* (2013.01)

(58) Field of Classification Search
CPC ... G06F 3/04883; G06F 3/04845; G06F 3/0481
USPC .......................................................... 715/745
See application file for complete search history.

(56) References Cited

U.S. PATENT DOCUMENTS

| 7,676,760 | B1 * | 3/2010 | Rosenquist | G06F 11/328 |
| | | | | 715/745 |
| 8,024,660 | B1 * | 9/2011 | Quinn | G06F 9/4446 |
| | | | | 715/745 |
| 8,856,670 | B1 * | 10/2014 | Thakur et al. | 715/765 |
| 2006/0046238 | A1 * | 3/2006 | DeGregory et al. | 434/350 |
| 2010/0083164 | A1 | 4/2010 | Martin et al. | |
| 2010/0175019 | A1 | 7/2010 | Sitton et al. | |
| 2012/0159345 | A1 * | 6/2012 | Gonsalves | G06F 3/0482 |
| | | | | 715/745 |
| 2012/0226626 | A1 | 9/2012 | Venkateswaran et al. | |
| 2014/0089824 | A1 * | 3/2014 | George et al. | 715/762 |
| 2014/0115491 | A1 * | 4/2014 | Cullin | G06F 3/0233 |
| | | | | 715/745 |

OTHER PUBLICATIONS

Ilkay Altintas; Lifecycle of Scientific Workflows and Their Provenance: A usage Perpective; © 2008; IEEE; p. 474-475.*

(Continued)

*Primary Examiner* — Linh K Pham
(74) *Attorney, Agent, or Firm* — Daniel R. Simek

(57) ABSTRACT

Embodiments of the present invention disclose a method, computer program product, and system for user interface customization. A computer records activity of a first computer on a user interface. The computer determines one or more repetitive activities of the first computer utilizing the recorded activity of the first computer. The computer determines a customized user interface for the first computer corresponding to the one or more repetitive activities of the first computer. In another embodiment, the computer initiates display of the customized user interface to the first computer. In another embodiment, the recorded activity of the first computer includes navigation through links in the user interface, applying filters to data in the user interface, and accessing data on the user interface.

17 Claims, 5 Drawing Sheets

(56) References Cited

OTHER PUBLICATIONS

Wright, "SAS®: The Ultimate Dashboard Machine", Paper BI-009, <http:www.sesug.org>, pp. 1-11.

Overton, "Lost in Wonderland? Methodology for a Guided Drill-Through Analysis Out of the Rabbit Hole", Paper 020-2012, pp. 1-11, SAS Global Forum 2012, Applied Business Intelligence, <http://support.sas.com/resources/papers/proceedings12/020-2012>.

* cited by examiner

CUSTOMIZING A DASHBOARD RESPONSIVE TO USAGE ACTIVITY

FIELD OF THE INVENTION

The present invention relates generally to the field of data presentation and analysis, and more particularly to a generating a customized dashboard of data.

BACKGROUND OF THE INVENTION

In an organization, a dashboard presents data relevant to a specific objective or business process (i.e. sales, production, and marketing) in an interactive user interface. Reporting data for business processes involves data corresponding to numerous relevant attributes. Dashboards primarily include a visual presentation of key performance indicators (KPIs), and allow an individual accessing the dashboard to navigate further into sections of the dashboard to see additional data. Individuals utilizing dashboards can have the ability to filter the data displayed on the dashboard (i.e. KPIs), and select attributes to display and compare data.

Business Intelligence (BI) involves analyzing data corresponding to a business and various processes associated with the business. This data can be presented in the form of a dashboard. Business Intelligence (BI) and dashboard applications can include logging capabilities that record and store actions of individuals utilizing dashboards. In some examples, the BI applications record and store the data corresponding to how individuals access a dashboard and utilize the dashboard (i.e. applying filters, navigation, and data comparisons).

SUMMARY

Embodiments of the present invention disclose a method, computer program product, and system for user interface customization. A computer records activity of a first computer on a user interface. The computer determines one or more repetitive activities of the first computer utilizing the recorded activity of the first computer. The computer determines a customized user interface for the first computer corresponding to the one or more repetitive activities of the first computer. In another embodiment, the computer initiates display of the customized user interface to the first computer. In another embodiment, the recorded activity of the first computer includes navigation through links in the user interface, applying filters to data in the user interface, and accessing data on the user interface.

DETAILED DESCRIPTION

Figure 1:
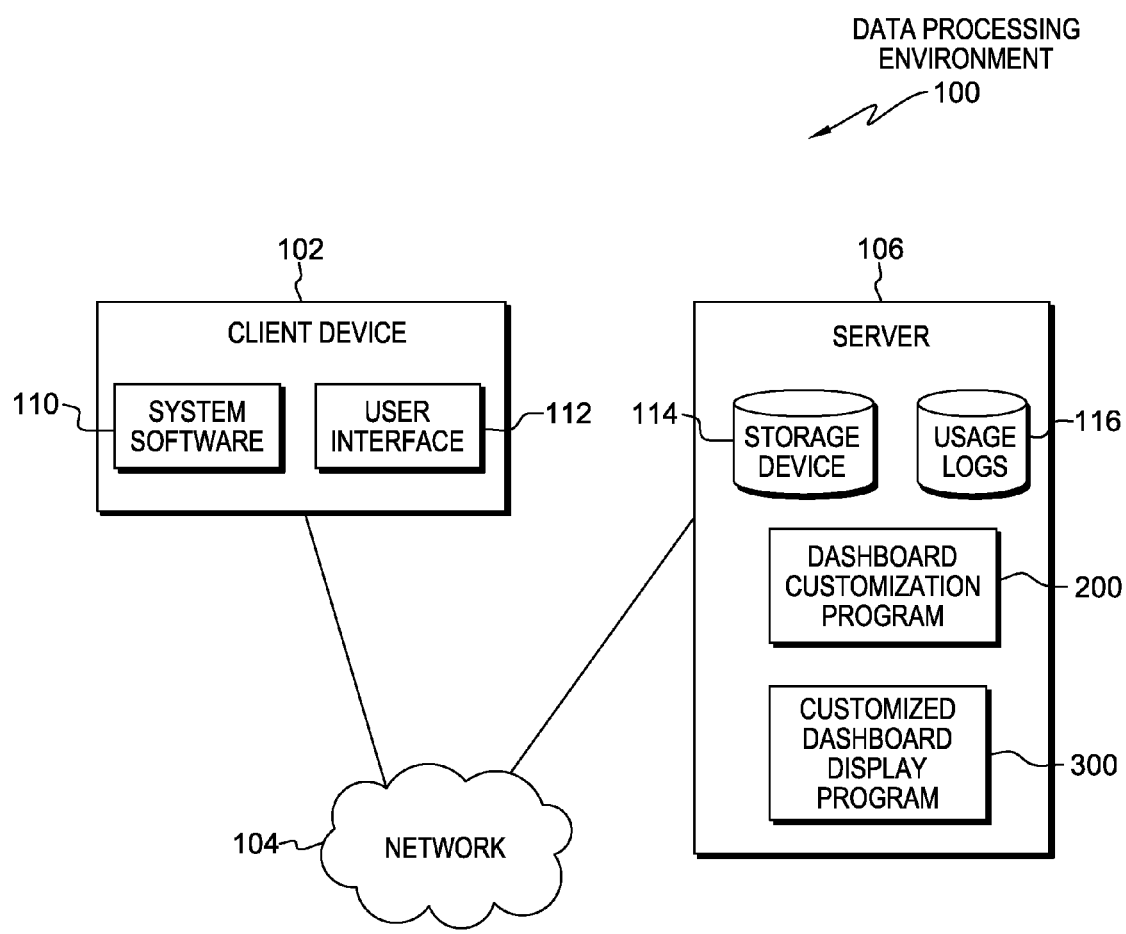
FIG. 1 is a functional block diagram of a data processing environment in accordance with an embodiment of the present invention.

Exemplary embodiments of the present invention allow for generation of a customized dashboard of data. In one embodiment, when an individual utilizes a dashboard, actions and navigation of the individual are recorded and can be utilized to determine a customized dashboard corresponding to individuals recorded activity. In another embodiment, individuals utilizing dashboards can define which data is recorded.

Embodiments of the present invention recognize that producing reports and dashboards that are relevant, and of interest to a wide set of individuals is difficult. Dashboards and reports can present data corresponding to complex business processes in many different ways. In situations where many different individuals utilize the same dashboard, generating a dashboard that satisfies all the needs of the individuals can become a problem which can decrease the effectiveness of the dashboard.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating data processing environment 100, in accordance with one embodiment of the present invention.

An exemplary embodiment of data processing environment 100 includes client device 102, network 104, and server 106. In one embodiment, an individual utilizing client device 102 access data on server 106 through network 104.

In various embodiments of the present invention, client device 102 may be a workstation, personal computer, personal digital assistant, mobile phone, or any other device capable of executing program instructions. In general, client device 102 is representative of any electronic device or combination of electronic devices capable of executing machine-readable program instructions, as described in greater detail with regard to FIG. 5. Client device 102 includes systems software 110 and user interface 112. In one embodiment, system software 110 may exist in the form of operating system software, which may be Windows®, LINUX®, and other application software such as internet applications and web browsers. User interface 112 allows an individual utilizing client device 102 to input information into client device 102. In exemplary embodiments, an individual utilizing client device 102 utilizes user interface 112 to access and navigate through data on server 106.

In one embodiment, client device 102 and server 106 communicate through network 104. Network 104 can be, for example, a local area network (LAN), a telecommunications network, a wide area network (WAN) such as the Internet, or a combination of the three, and include wired, wireless, or fiber optic connections. In general, network 104 can be any combination of connections and protocols that will support communications between client device 102 and server 106 in accordance with exemplary embodiments of the present invention.

In exemplary embodiments, server 106 includes storage device 114, usage logs 116, dashboard customization program 200, and customized dashboard display program 300. In one embodiment, server 106 facilitates individuals (i.e. client device 102) accessing data corresponding to an organization. In an example, server 106 is a Business Intelligence (BI) server, or supports BI and dashboard applications corresponding to processes associated with an organization. Dashboards present data relevant to an objective or business process (i.e. sales, production, and marketing) in an interactive user interface. In other embodiments, a dashboard is an example of a user interface utilized by an individual utilizing client device 102. In exemplary embodiments, server 106 can be a desktop computer, a computer server, or any other computer systems known in the art. In certain embodiments, server 106 represents a computer system utilizing clustered computers and components (e.g., database server computers, application server computers, etc.) that act as a single pool of seamless resources when accessed by elements of data processing environment 100. In general, server 106 is representative of any electronic device or combination of electronic devices capable of executing machine-readable program instructions, as described in greater detail with regard to FIG. 5.

Storage device 114 and usage logs 116 can be implemented with any type of storage device that is capable of storing data that may be accessed and utilized by client device 102 and server 110, such as a database server, a hard disk drive, or flash memory. In other embodiments, storage device 114 and usage logs 116 can represent multiple storage devices within server 106. In exemplary embodiments, storage device 114 stores data that individuals utilizing client device 102 can access through use of dashboards and reports. In an example, storage device 114 includes product data (i.e. sales, revenue, and production) that an individual utilizing client device 102 accesses through utilization of a dashboard report. In exemplary embodiments, usage logs 116 stores logs of activity on server 106 corresponding to individuals utilizing client device 102. In an example, when an individual utilizing client device 102 utilizes a dashboard report to access data in storage device 114, the activity of client device 102 (i.e. applying filters, navigation, and data comparisons) is stored in usage logs 116 corresponding to client device 102. In exemplary embodiments, dashboard customization program 200 customizes a dashboard for an individual utilizing client device 102 corresponding to the usage activity of client device 102. Dashboard customization program 200 is discussed in greater detail with regard to FIG. 2. In exemplary embodiments, customized dashboard display program 300 displays a customized dashboard to an individual utilizing client device 102 corresponding to information determined in dashboard customization program 200. Customized dashboard display program 300 is discussed in greater detail with regard to FIG. 3. In exemplary embodiments, dashboard customization program 200 utilizes data in storage device 114 and usage logs 116.

Figure 2:
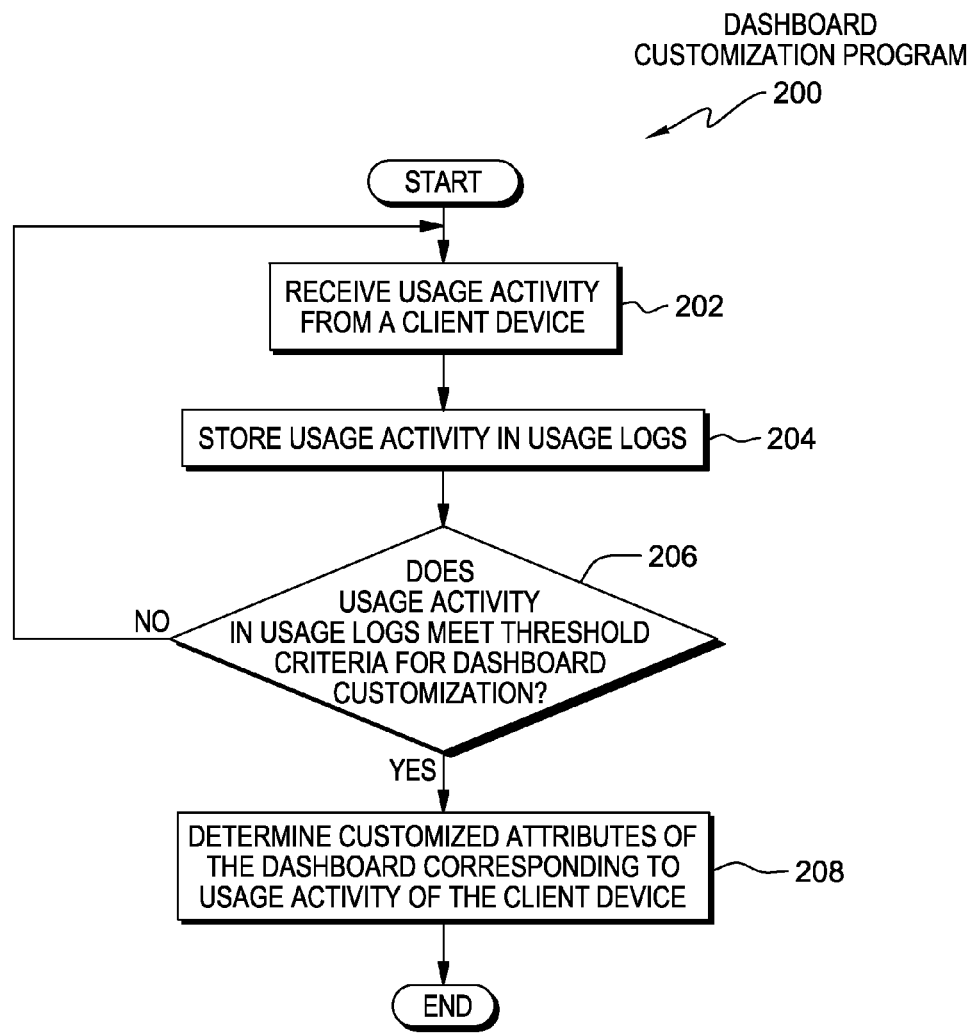
FIG. 2 is a flowchart depicting operational steps of a program for customizing a dashboard corresponding to activity of a client device, in accordance with an embodiment of the present invention.

FIG. 2 is a flowchart depicting operational steps of dashboard customization program 200 in accordance with an exemplary embodiment of the present invention. In one embodiment, dashboard customization program 200 operates while an individual utilizing client device 102 is accessing data in storage device 114 on server 106.

In step 202, dashboard customization program 200 receives usage activity from a client device. In one embodiment, dashboard customization program 200 receives usage activity of an individual utilizing client device 102 to access data stored in storage device 114 in server 106. In exemplary embodiments, an individual utilizing client device 102 utilizes dashboards to access data on storage device 114 in server 106. For example, an individual utilizing client device 102 utilizes example dashboard 400 (depicted in FIG. 4A) to access data on storage device 114. Example dashboard 400 includes reporting units 410, 412, 414, 416, and 418. In exemplary embodiments, reporting units 410, 412, 414, 416, and 418 are representations of sections of example dashboard 400 that include data from storage device 114 and allow an individual utilizing client device 102 to navigate or customize data in reporting area 410, 412, 414, 416, and 418. In exemplary embodiments, elements of a dashboard (i.e. reporting units 410, 412, 414, 416, and 418) have corresponding usage data that may be accessed by dashboard customization program 200, and information corresponding to customization (i.e. threshold criteria for dashboard customization, and which data can be customized). In one embodiment, dashboard customization program 200 utilizes logging capabilities of server 106 to record usage activity of client device 102 in reporting units 410, 412, 414, 416, and 418 in example dashboard 400. In exemplary embodiments, an individual utilizing client device 102 can determine usage activity that dashboard customization program 200 receives. For example, an individual utilizing client device 102 utilizes user interface 112 to determine that dashboard customization program 200 receives usage activity for reporting unit 410, 416, and 418. In this example, dashboard customization program 200 receives usage activity for client device 102 corresponding to reporting units 410, 416, and 418, and not reporting units 412 and 414. In exemplary embodiments, prior to dashboard customization program 200 initiating, an individual utilizing client device 102 determines which elements of a dashboard (i.e. reporting units 410, 412, 414, 416, and 418) provide usage information to dashboard customization program 200. In a first example, an individual utilizing client device 102 applies filters to reporting units 410, 412 and 416. In this example, dashboard customization program 200 receives usage activity corresponding to reporting units 410 and 416, but not reporting unit 412.

In step 204, dashboard customization program 200 stores usage activity in usage logs. In one embodiment, dashboard customization program 200 stores received usage activity (from step 202) of client device 102 in usage logs 116. In exemplary embodiments, the usage logs include an indication of usage activity corresponding to elements of a dashboard (i.e. reporting units 410, 412, 414, 416, and 418) that dashboard customization program 200 can utilize to customize the dashboard. In an example with regard to an individual utilizing client device 102 determining that dashboard, customization program 200 receives usage activity for reporting unit 410, 416, and 418, dashboard customization program 200 stores usage activity for reporting unit 410, 416, and 418 in usage logs 116 corresponding to client device 102. In the previously discussed first example, an individual utilizing client device 102 applies filters to reporting units 410, 412 and 416. In this example, dashboard customization program 200 stores usage activity corresponding to reporting units 410 and 416 in usage logs 116, but not activity corresponding to reporting unit 412. In exemplary embodiments, dashboard customization program 200 stores data corresponding client device 102 navigating through links in reporting units 410, 412, 414, 416, and 418, accessing data in reporting units 410, 412, 414, 416, and 418, and applying filers to reporting units 410, 412, 414, 416, and 418.

In step 206, dashboard customization program 200 determines whether usage activity in usage logs meet threshold criteria for dashboard customization. In one embodiment, dashboard customization program 200 measures usage activity in usage logs 116 against predefined threshold criteria to determine whether usage activity corresponding to client device 102 meets predefined threshold criteria for dashboard customization. Predefined threshold criteria for activity in a dashboard includes, but is not limited to number of times a navigation occurs, number of times a report is run, accessing a dashboard from a certain client device 102 (i.e. different device types), specified inputs, and applying filters. In other examples, the predefined threshold criteria are based on a percentage of time that an individual utilizing client device 102 does a certain activity. In one embodiment, if dashboard customization program 200 determines that the usage activity meets, or exceeds the predefined threshold criteria, then the dashboard can be customized for client device 102. In exemplary embodiments, the predefined threshold criteria includes activity thresholds for reporting units 410, 412, 414, 416 and 418 in example dashboard 400, and an indication of a group of individuals that the threshold criteria is associated with. In another embodiment, dashboard customization program 200 determines whether each instance of usage activity in usage logs 116 meet threshold criteria for dashboard customization. For example, the set of threshold criteria that exists for client device 102 may be different than threshold criteria for other individuals in an organization. In the previously discussed first example, dashboard customization program 200 measures the usage activity in usage logs 116 corresponding to reporting units 410, 416, and 418 against the predefined threshold criteria for dashboard customization.

In an example, dashboard customization program 200 determines that an individual utilizing client device 102 navigated to a specific set of data in reporting unit 416 on six occasions. In this example, dashboard customization program 200 measures the six occasions stored in usage logs 116 to a predetermined navigation threshold criteria corresponding to client device 102 of four, and determines that the usage activity meets the predefined navigation threshold criteria for dashboard customization. In another example, dashboard customization program 200 determines that an individual utilizing client device 102 applied a filter to data in reporting unit 410 on eight occasions. In this example, dashboard customization program 200 measures the eight occasions stored in usage logs 116 to a predetermined filter application criteria of seven, and determines that the usage activity meets the predefined filter application threshold for dashboard customization.

In step 208, dashboard customization program 200 determines customized attributes of the dashboard corresponding to usage activity of the client device. In one embodiment, responsive to determining that usage activity in usage logs 116 corresponding to client device 102 meets threshold criteria for dashboard customization, dashboard customization program 200 determines attributes of the dashboard to customize for client device 102. In exemplary embodiments, the determined customized attributes of the dashboard include elements of the dashboard (i.e. reporting units 410, 412, 414, 416, and 418) corresponding to the usage activity in usage logs 116 that dashboard customization program 200 determines to meet the threshold criteria. With regard to the previously discussed example of an individual utilizing client device 102 to navigate to a specific set of data in reporting unit 416 on six occasions, dashboard customization program 200 determines that reporting unit 416 includes customized attributes corresponding to the navigation activity of client device 102.

In another embodiment, dashboard customization program 200 can determine customized attributes of a dashboard corresponding to usage activity of an individual locally utilizing server 106. In an example, an individual utilizes server 106 to access data on storage device 114 through dashboards, and dashboard customization program 200 receives the usage activity of the individual locally utilizing server 106 (step 202), and stores the usage activity in usage logs 116 (step 204). In this example, dashboard customization program 200 determines whether usage activity in usage logs 116 corresponding to the individual locally utilizing server 106 meets threshold criteria for dashboard customization (decision step 206). Responsive to determining that usage activity in usage logs 116 corresponding to the individual locally utilizing server 106 meets threshold criteria for dashboard customization, dashboard customization program 200 determines attributes of the dashboard to customize (step 208).

Figure 3:
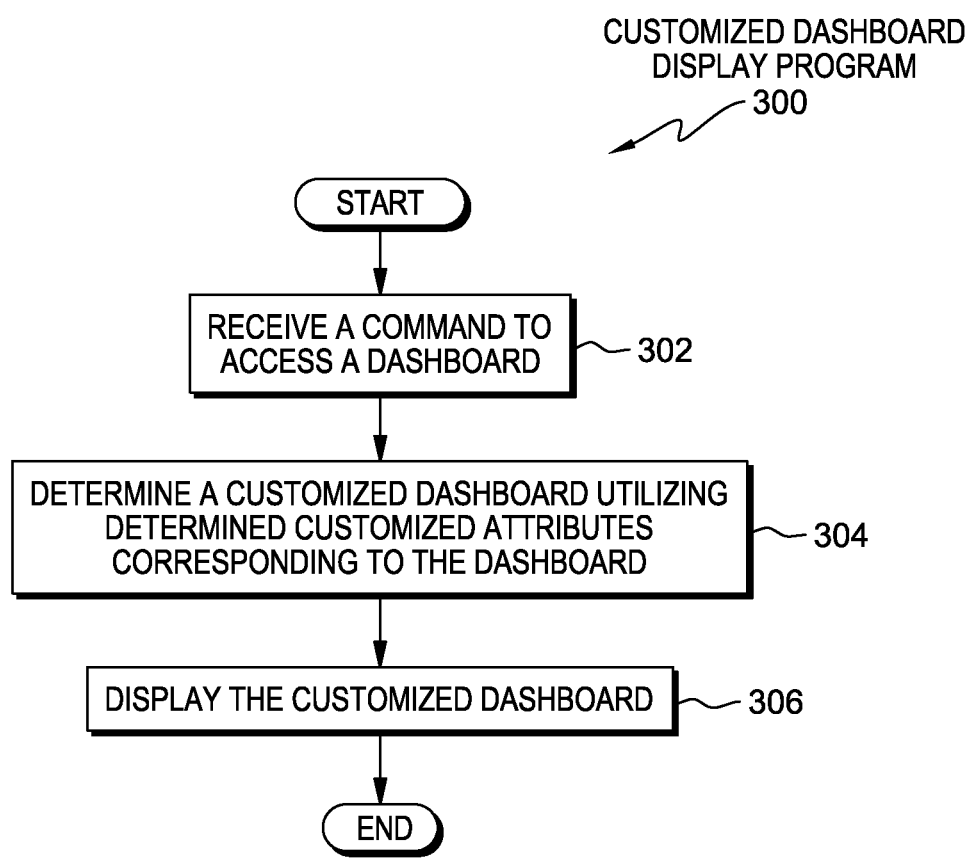
FIG. 3 is a flowchart depicting operational steps of a program for displaying a customized dashboard, in accordance with an embodiment of the present invention.

FIG. 3 is a flowchart depicting operational steps of customized dashboard display program 300 in accordance with an exemplary embodiment of the present invention. In one embodiment, customized dashboard display program 300 utilizes information determined in dashboard customization program 200.

In step 302, customized dashboard display program 300 receives a command to access a dashboard. In one embodiment, customized dashboard display program 300 receives a command from client device 102 to access a dashboard on storage device 114 in server 106.

In step 304, customized dashboard display program 300 determines a customized dashboard utilizing determined customized attributes corresponding to the dashboard. In one embodiment, customized dashboard display program 300 utilizes determined customized attributes (from step 208 of dashboard customization program 200) to determine a customized dashboard for client device 102. In exemplary embodiments, the customized dashboard includes one or more shortcuts that lead to usage activities that meet the predefined threshold criteria for dashboard customization (from step 206 of dashboard customization program 200). Example customized dashboard 450 (FIG. 4B) is an exemplary depiction a dashboard (i.e. example dashboard 400) including shortcut 460. In one embodiment, customized dashboard display program 300 determines a customized dashboard that includes the customized attributes determined in step 208 of customized dashboard program 200. With regard to the preciously discussed example of an individual utilizing client device 102 to navigate to a specific set of data in reporting unit 416 on six occasions, shortcut 460 leads to the specific set of data in reporting unit 416.

In another previously discussed example regarding to an individual utilizing client device 102 applying a filter to data in reporting unit 410 on eight occasions, shortcut 460 applies the corresponding filter to reporting unit 410. In this example, if the individual utilizing client device 102 accesses shortcut 460, then example customized dashboard 450 applies the corresponding filter to reporting unit 410. In other examples, customized dashboard display program 300 can customize a dashboard by adding indications to information in the dashboard (i.e. highlighting, font coloring), formatting the dashboard for a display type (i.e. laptop display, mobile device display, etc), and rearranging data in the dashboard (i.e. changing the locations of reporting units 410, 412, 414, 416, and 418).

In step 306, customized dashboard display program 300 displays the customized dashboard. In one embodiment, customized dashboard display program 300 initiates display of the customized dashboard (determined in step 304) to client device 102. In an example with regard to FIGS. 4A and 4B, customized dashboard display program 300 displays example customized dashboard 450 to client device 102 instead of example dashboard 400.

Figure 4A:
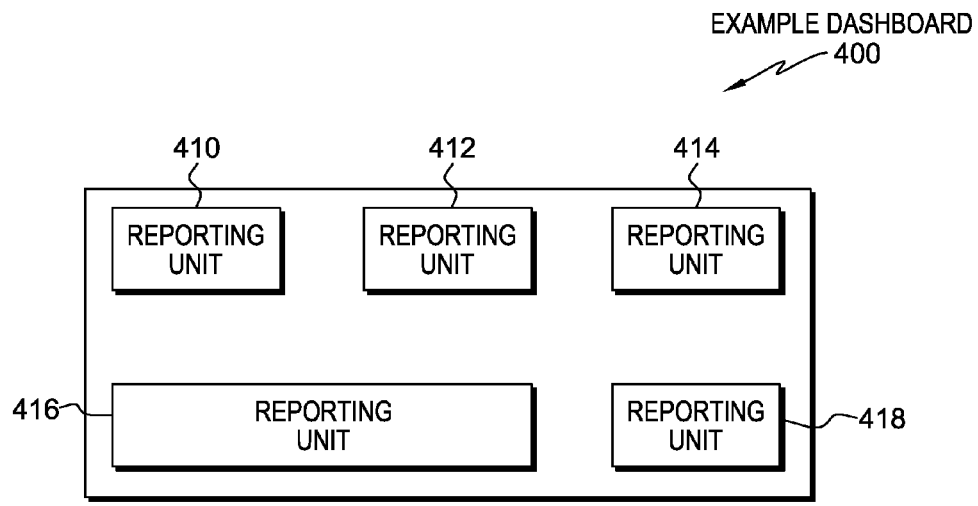
FIGS. 4A and B are exemplary depictions of dashboards in accordance with exemplary embodiments of the present invention.

FIG. 4A is an exemplary depiction of example dashboard 400 in accordance with an exemplary embodiment of the present invention. Example dashboard 400 includes reporting units 410, 412, 414, 416, and 418. In exemplary embodiments, reporting units 410, 412, 414, 416, and 418 are representations of sections of example dashboard 400 that include data from storage device 114 and allow an individual utilizing client device 102 to navigate or customize data in reporting area 410, 412, 414, 416, and 418.

Figure 4B:
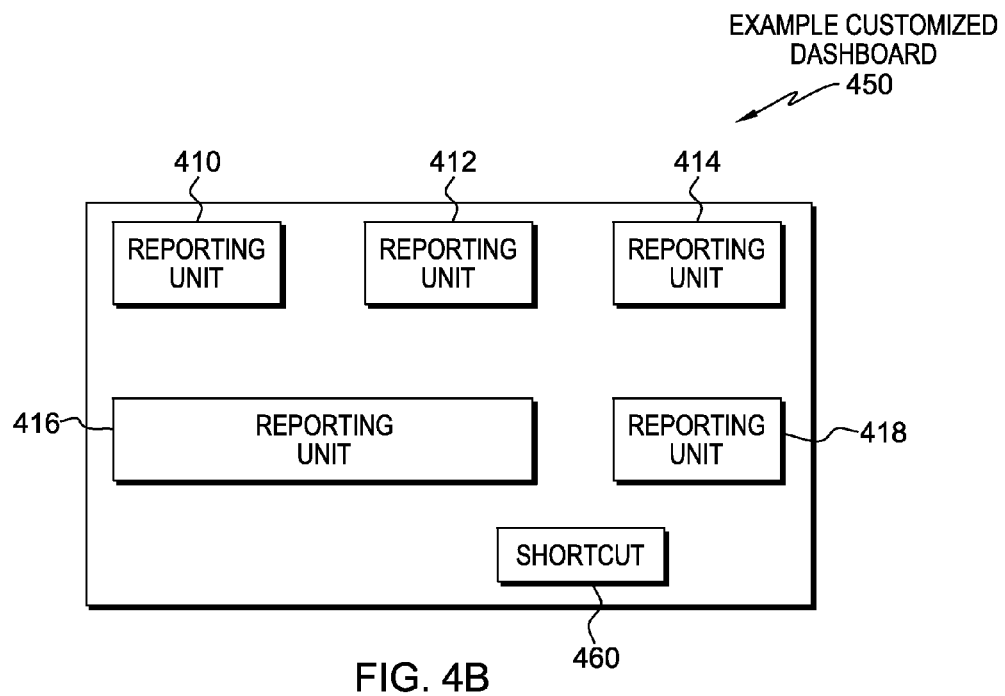

FIG. 4B is an exemplary depiction of example customized dashboard 450 in accordance with an exemplary embodiment of the present invention. In one embodiment, example customized dashboard is a depiction of example dashboard 400 (FIG. 4A) that includes shortcut 460. In exemplary embodiments, dashboard customization program 200 and customized dashboard display program 300 utilizes data in usage logs 116 and predefined threshold criteria to determine example customized dashboard 450.

Figure 5:
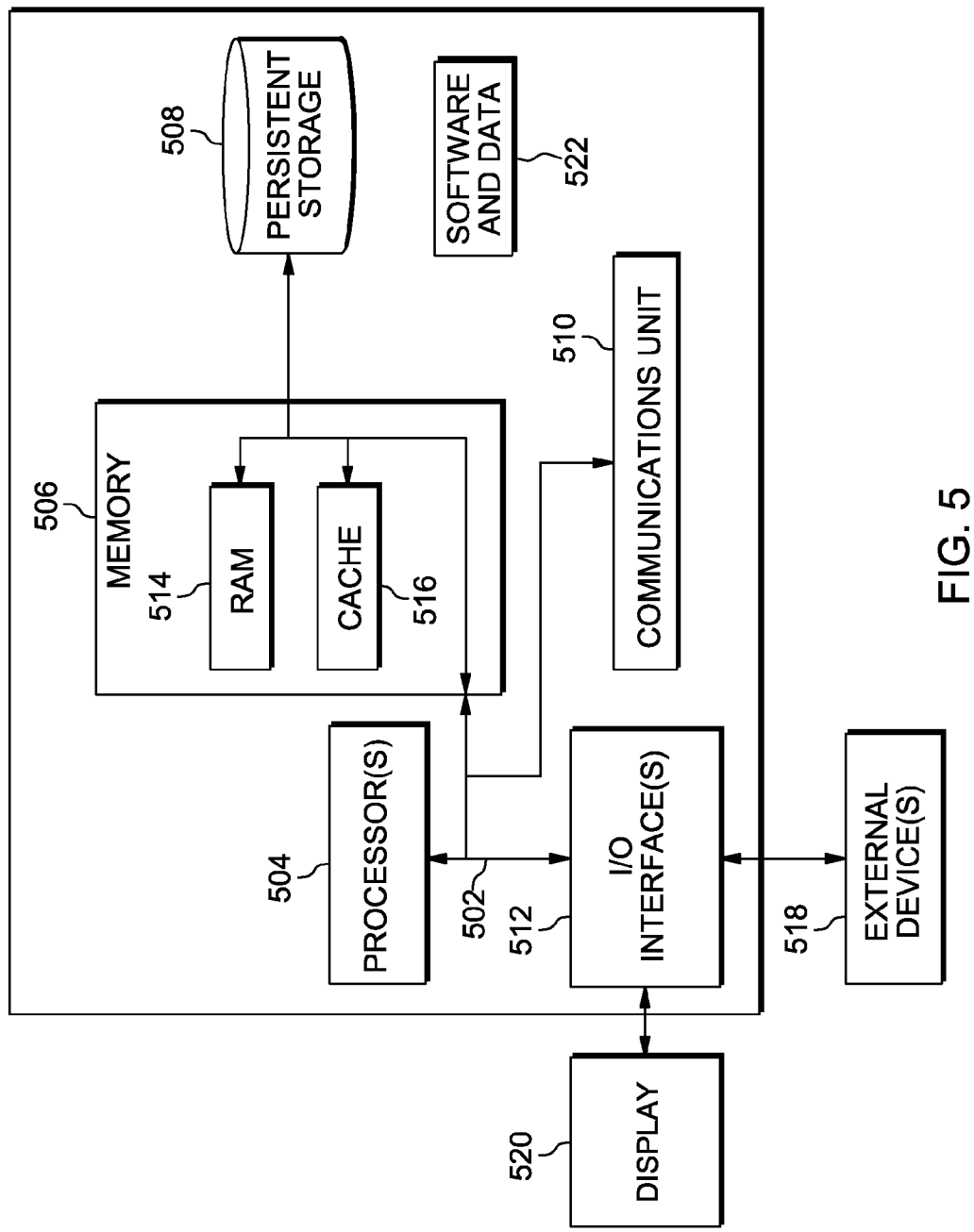
FIG. 5 depicts a block diagram of components of the computing system of FIG. 1 in accordance with an embodiment of the present invention.

FIG. 5 depicts a block diagram of components computer 500, which is representative of client device 102 and server 106 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media. Software and data 522 stored in persistent storage 508 access and/or execution by processor(s) 504 via one or more memories of memory 506. With respect to client device 102, software and data 522 includes system software 110. With respect to server 106, software and data 522 includes dashboard customization program 200.

In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Software and data 522 may be downloaded to persistent storage 508 through communications unit 510.

I/O interface(s) 512 allows for input and output of data with other devices that may be connected to computer 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data 522 can be stored on such portable computer-readable storage media and can be loaded onto persistent storage 508 via I/O interface(s) 512. I/O interface(s) 512 also can connect to a display 520.

Display 520 provides a mechanism to display data to a user and may be, for example, a computer monitor. Display 520 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for user interface customization, the method comprising:
    identifying, by one or more processors, a definition indicating one or more elements of a user interface on which to record activity of a user and a definition indicating one or more elements of the user interface on which activity of the user will not be recorded;
    recording, by one or more processors, activity of the user interacting with the defined one or more elements of the user interface on which to record activity;
    determining, by one or more processors, one or more repetitive activities of the user utilizing recorded activity of the user based on a comparison of the recorded activity of the user interacting with the defined one or more elements of the user interface to one or more threshold criteria values for user interface customization;
    determining, by one or more processors, one or more attributes of a user interface corresponding to repetitive activities of the user;
    modifying, by one or more processors, the determined attributes of the user interface corresponding to the repetitive activities of the user, wherein the modifications include one or more shortcuts to repetitive activities of the user, and user interface display preferences corresponding to repetitive activities of the user; and
    generating, by one or more processors, a customized user interface for the user corresponding to the one or more repetitive activities of the user and the modified determined attributes of the user interface.

2. The method of claim 1, further comprising:
    initiating, by one or more processors, display of the generated customized user interface to the user.

3. The method of claim 1, wherein the customized user interface includes a link corresponding to at least one of the one or more repetitive activities of the user.

4. The method of claim 1, wherein the recorded activity of the user comprises, at least in part, navigation through links in the user interface, accessing the user interface with a certain device type, applying filters to data in the user interface, and accessing data on the user interface.

5. The method of claim 1, wherein the one or more threshold criteria values for user interface customization include a threshold based on the user accessing an element of the user interface utilizing a certain device type.

6. The method of claim 1, wherein the one or more threshold criteria values for user interface customization include a threshold based on applying filters to data in an element of the user interface.

7. The method of claim 1, wherein the one or more threshold criteria values for user interface customization include a threshold based on minimum amounts of navigation through links in an element of the user interface.

8. The method of claim 1, wherein the elements of the user interface are groupings of one or more items in the user interface that are configured to receive interaction from the user and recording and reporting the received interaction from the user.

9. A computer program product for user interface customization, the computer program product comprising:
    one or more computer-readable storage devices and program instructions stored on the one or more computer-readable storage devices, the program instructions comprising:

program instructions to identify a definition indicating one or more elements of a user interface on which to record activity of a user and a definition indicating one or more elements of the user interface on which activity of the user will not be recorded;

program instructions to record activity of the user interacting with the defined one or more elements of the user interface on which to record activity;

program instructions to determine one or more repetitive activities of the user utilizing recorded activity of the user based on a comparison of the recorded activity of the user interacting with the defined one or more elements of the user interface to one or more threshold criteria values for user interface customization;

program instructions to determine one or more attributes of a user interface corresponding to repetitive activities of the user;

program instructions to modify the determined attributes of the user interface corresponding to the repetitive activities of the user, wherein the modifications include one or more shortcuts to repetitive activities of the user, and user interface display preferences corresponding to repetitive activities of the user; and program instructions to generate a customized user interface for the user corresponding to the one or more repetitive activities of the user and the modified determined attributes of the user interface.

10. The computer program product of claim 9, further comprising program instructions to:

initiate display of the generated customized user interface to the user.

11. The computer program product of claim 9, wherein the customized user interface includes a link corresponding to at least one of the one or more repetitive activities of the user.

12. The computer program product of claim 9, wherein the recorded activity of the user comprises, at least in part, navigation through links in the user interface, accessing the user interface with a certain device type, applying filters to data in the user interface, and accessing data on the user interface.

13. The computer program product of claim 9, wherein the one or more threshold criteria values for user interface customization includes a threshold based on at least one of:

the user accessing an element of the user interface utilizing a certain device type;

applying filters to data in an element of the user interface; and minimum amounts of navigation through links in an element of the user interface.

14. A computer system for user interface customization, the computer system comprising:

one or more computer processors; and one or more computer-readable storage media;

program instructions stored on the computer-readable storage media for execution by at least one of the one or more processors, the program instructions comprising:

program instructions to identify a definition indicating one or more elements of a user interface on which to record activity of a user and a definition indicating one or more zero or more elements of the user interface on which activity of the user will not be recorded;

program instructions to record activity of the user interacting with the defined one or more elements of the user interface on which to record activity;

program instructions to determine one or more repetitive activities of the user utilizing recorded activity of the user based on a comparison of the recorded activity of the user interacting with the defined one or more elements of the user interface to one or more threshold criteria values for user interface customization;

program instructions to determine one or more attributes of a user interface corresponding to repetitive activities of the user;

program instructions to modify the determined attributes of the user interface corresponding to the repetitive activities of the user, wherein the modifications include one or more shortcuts to repetitive activities of the user, and user interface display preferences corresponding to repetitive activities of the user; and program instructions to generate a customized user interface for the user corresponding to the one or more repetitive activities of the user and the modified determined attributes of the user interface.

15. The computer system of claim 14, further comprising program instructions to:

initiate display of the generated customized user interface to the user.

16. The computer system of claim 14, wherein the customized user interface includes a link corresponding to at least one of the one or more repetitive activities of the user.

17. The computer system of claim 14, wherein the one or more threshold criteria values for user interface customization includes a threshold based on at least one of:

the user accessing an element of the user interface utilizing a certain device type;

applying filters to data in an element of the user interface; and minimum amounts of navigation through links in an element of the user interface.

* * * * *